March 16, 1971  A. A. DUKERT ET AL  3,570,062
MIDSTREAM RADIAL VALVE FOR IN-LINE EXTRUSION
OF VISCOUS THERMOPLASTICS
Filed Feb. 14, 1969  2 Sheets-Sheet 1

INVENTORS.
ANDREW A. DUKERT
ALKIS CHRISTOFAS

BY Stanley Bilker
ATTORNEY

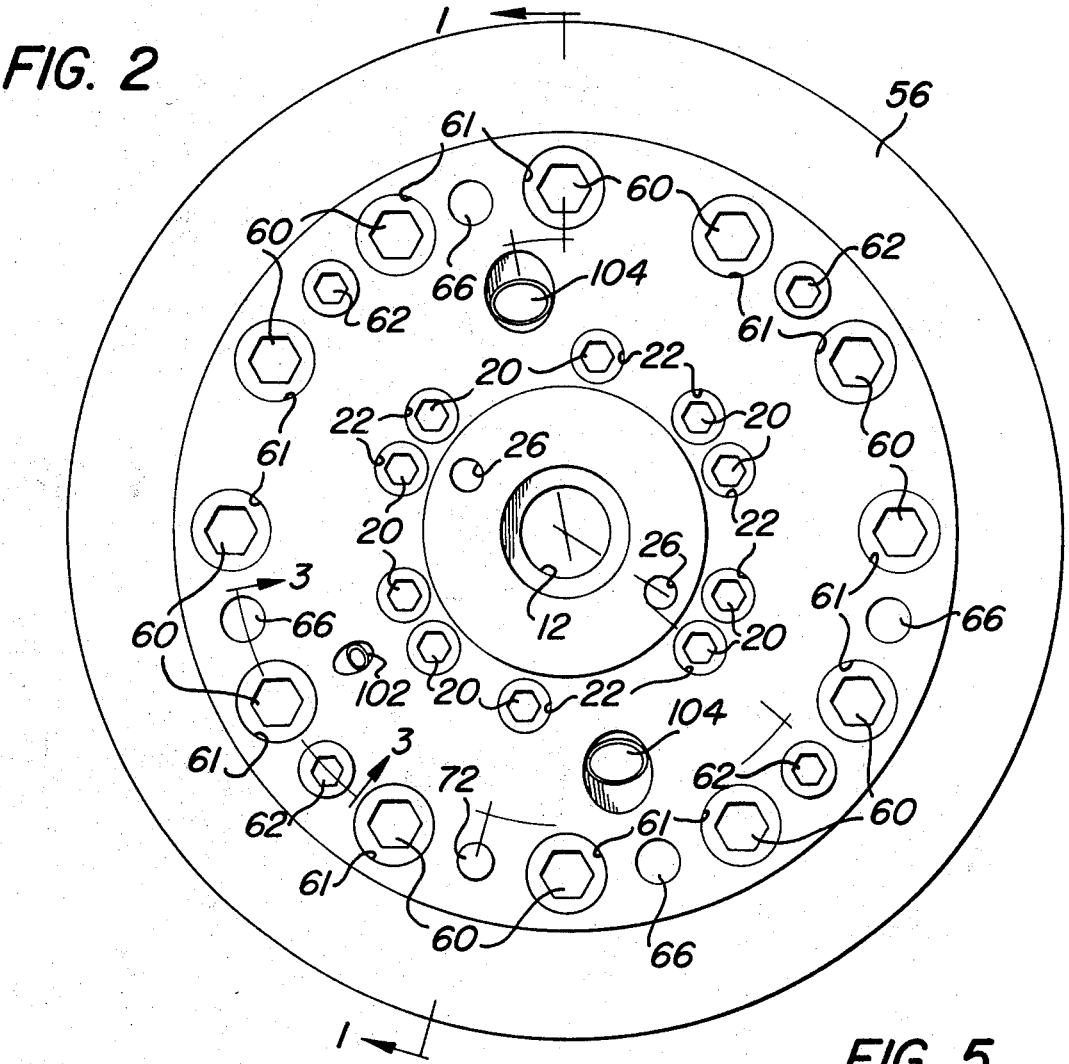
FIG. 2
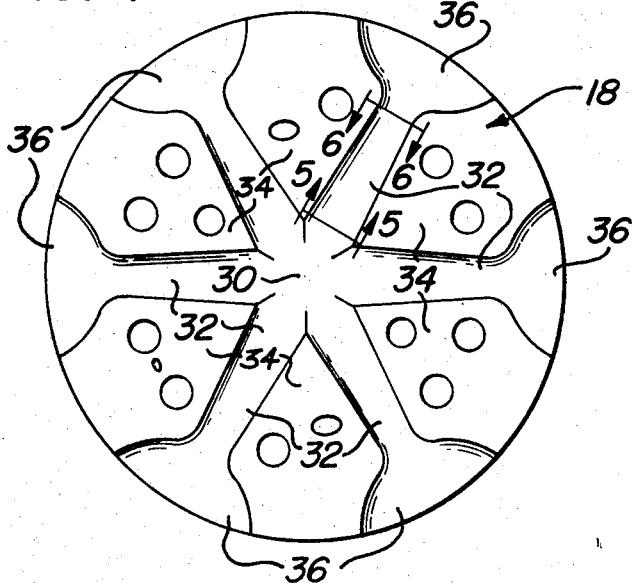
FIG. 4
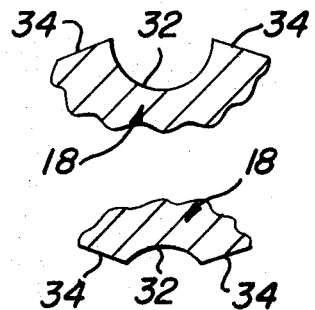
FIG. 5
FIG. 6
INVENTORS.
ANDREW A. DUKERT
ALKIS CHRISTOFAS
BY *Stanley Bilker*
ATTORNEY United States Patent Office 3,570,062
Patented Mar. 16, 1971

3,570,062
MIDSTREAM RADIAL VALVE FOR IN-LINE EXTRUSION OF VISCOUS THERMOPLASTICS
Andrew Anthony Dukert, Ambler, and Alkis Christofas, Philadelphia, Pa., assignors to Pennwalt Corporation, Philadelphia, Pa.
Filed Feb. 14, 1969, Ser. No. 799,223
Int. Cl. B29d 23/04
U.S. Cl. 18—14                                    8 Claims

ABSTRACT OF THE DISCLOSURE

An in-line valving die for extruding viscous thermoplastics. Outwardly diverging semi-circular channels first direct the material from the extruder in a continuous stream of sheet-like configuration, which is deposited in a high-inventory, annular cavity. The material then passes radially inward through an adjusable disk valve into a centrally disposed relaxation reservoir to allow for recovery from the uniform shearing action of the valve prior to final shaping in the forming die. All increments of the material advance with equal back pressure to deliver well converted melts without surface defects or internal stresses.

This invention relates to the extrusion of thermoplastic materials, such as polyvinylidene fluoride. More particularly, it relates to an improved system for extruding high molecular weight viscous polymers, such as polyvinylidene fluoride, at increased rates while producing homogeneous extrudates which are free of surface flaws or internal defects, fractures or dislocations. The instant invention is especially directed to a novel and improved die design for in-line extrusion of symmetrical and/or asymmetrical rods, bars, piping or tubing.

Polyvinylidene fluoride is a fluorine-containing thermoplastic resin. It is a crystalline, high molecular weight polymer of vinylidene fluoride. From its composition and structure $PVF_2$ has excellent stability to environmental stresses. Other properties derived from its stable and uniform composition are thermal stability, high impact, tensile and compression strength, low level of creep and excellent chemical resistance to a great number of compounds which attack many of the commonly used polymeric materials.

Polyvinylidene fluoride can be fabricated into various forms, i.e., shapes, rods, tubing, pipe, wire coating and jackets, or film by using known extruding means. In all of the above extrusion applications $PVF_2$ behaves as a true thermoplastic and can be processed generally by using known extruding means and tooling.

However, vinylidene fluoride as a high molecular weight, high fluoride content polymer with a high melting point is characterized by a rather high melt viscosity at processing temperatures, highly viscoelastic properties of the melt and a rather low critical shear point. In forming $PVF_2$ by the prior art extrusion methods and tooling, especially at high throughput rates while using dies of conventional configuration, the above properties can be the cause of melt fracture and improperly converted melt and result in internal stresses affecting the strength and shape stability of the end construction, especially in environments of fluctuating or recycling high temperature.

In our prior Pat. No. 3,402,427, we described and showed a crosshead type die for extruding high molecular weight viscous polymers at high output rates. The prior patented construciton introduced a valving mechanism utilizing at least two adjustable frusto-conical annular passages which were located downstream of the extruder head. The patented crosshead die design permitted adjustable streamlined flow and provided for controlled pressure drop and alternating high shear, laminar and relaxation flow zones. Extensive field tests of the crosshead design have indicated, that it delivers a melt of excellent conversion together with thermal and physical homogeneity without surface defects or internal stresses at high rates of throughput.

As is well known, crosshead dies deliver the melt at right angles to the machine direction and accomplishes the result by means of an internal streamlined flow deflector. However, where it is desirable to extrude piping, tubing or rod, the use of a crosshead die requires costly and cumbersome rearrangement of machinery and auxiliary equipment. In many cases, right angle configuration of the die with the extruder is impossible and can be justified only for permanent production lines where materials dictate that such crosshead tooling is absolutely mandatory.

Nonetheless, when it is desired to utilize in-line tooling where the melt is formed in the extruder machine direction, a basic problem arises in the mode of mounting the valving system without conflicting with the streamlined laminar flow direction. That is, the mounting of an internal valving system for an in-line extrusion arrangement usually requires the use of radial spiders or webs for supporting the valve elements. Since the radial spiders and/or supporting webs for the valves act to deflect the flow of plastic material therethrough, the recombination of the material immediately behind the supporting barriers can result in fissures and hence internal and external flows. As is also evident, it is difficult to maintain temperature across the entire section of the spiders.

In our prior patent application Ser. No. 793,105, filed Jan. 22, 1969, we showed and described an in-line extrusion die employing an adjustable conical valving member suspended within the body by radial spiders or webs. The conical valve was located upstream of the high inventory reservoir, the latter delivering the melt through channels between the spiders into the downstream recovery or relaxation zone. The instant invention employs an adjustable radial valve intermediate or midstream of the high inventory cavity and the relaxation zone. Semicircular channels direct the thermoplastic material from the extruder in a continuous stream of sheet-like configuration into the annular high inventory reservoir from which the melt is delivered radially inward and symmetrically through the valve into the central annular relaxation zone so that spiders and webs are eliminated.

It is therefore an object of this invention to provide a spiderless valving mechanism for in-line extrusion of viscous thermoplastic materials which will deliver a melt of excellent conversion and thermal and physical homogeneity.

Another object of this invention is to provide an in-line midstream valving system for extrusion of viscous thermoplastic material in which well converted melts can be delivered at higher outputs.

Another object of this invention is to provide an in-line extrusion valve which avoids the use of supporting spiders or webs.

Still another object of this invention is to provide an in-line valve mechanism and method to produce pipe and tubing of various diameters and dimensions.

Yet another object of this invention is to provide an in-line valving method and apparatus for use with viscoelastic polymers whereby ready compensation may be made for interruptions produced by supporting webs.

Yet still another object of this invention is to provide an in-line valving mechanism for use with viscoelastic resins wherein the valving means is located upstream of the relaxation zones.

Yet a further object of this invention is to provide a valve for in-line extrusion of viscoelastic material in which adjustment of flow is accomplished with great facility.

Other objects of this invention are to provide an improved device and method of the character described which is easily and economically produced, which is sturdy in construction, and both highly efficient and effective in operation.

With the above and related objects in view, this invention consists of the details of construction and combination of parts as will be more fully understood from the following detailed description when read in conjunction with the accompanying drawings in which:

FIG. 2 is a transverse view taken along lines 2—2 of FIG. 1.

FIG. 4 is a front plan view of a deflector member embodied in this invention.

FIG. 5 is a sectional view taken along lines 5—5 of FIG. 4.

FIG. 6 is a sectional view taken along lines 6—6 of FIG. 4.

Figure 1:
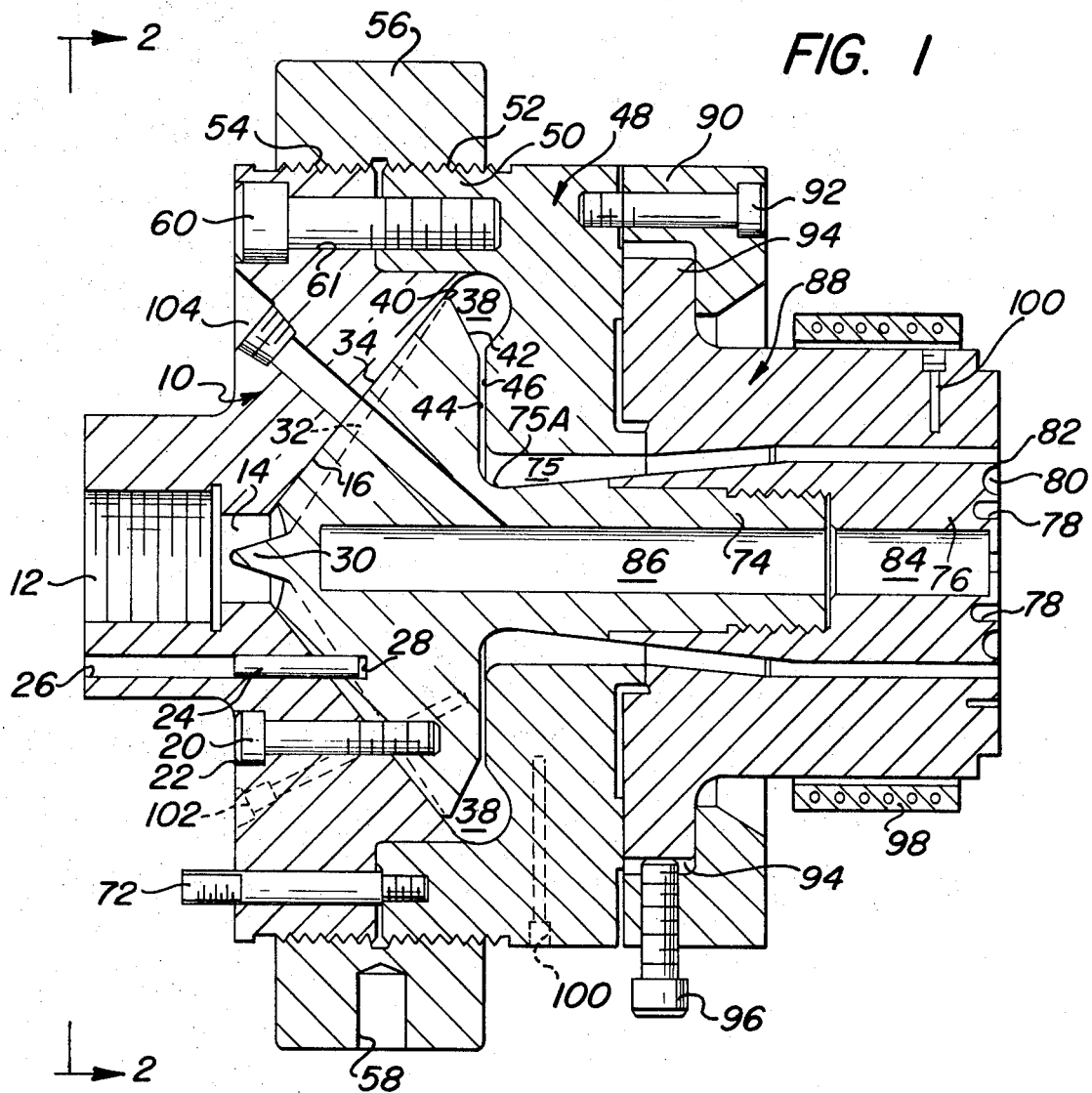
FIG. 1 is a longitudinal sectional view of a valving die embodying our invention for in-line extrusion of high viscosity thermoplastic material taken along lines 1—1 of FIG. 2.
Figure 3:
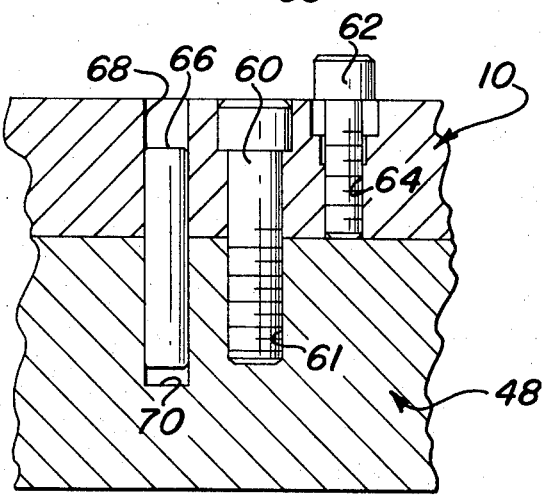
FIG. 3 is a sectional view taken along lines 3—3 of FIG. 2.

Referring now in greater detail to the drawings in which similar reference characters refer to similar part, we show an in-line extrusion die in which the converging flow through its internal cavity follows a symmetrical continuous stream before entering the valving area or the critical forming zone.

Primary body member 10 is coupled to the complementary threaded end of a conventional extruder (not shown) by means of an internally threaded bore 12. The bore 12 is in communication with a passageway 14 which flares outwardly at 16 into a concave generally conical configuration. A complementary deflector member 18 is rigidly secured in abutment with the concave conical surface 16 by a plurality of circumferentially spaced screws 20 which pass through counterbored holes 22 in the body member 10 and thread within tapped holes in the deflector 18. A pair of pins or dowels 24 press fit within bores 26 in the primary body member 10 slidably engage registering apertures 28 in the deflector 18 and insure concentric alignment of the latter within the conical surface 16.

The deflector 18 includes a nose 30 which projects into the passageway 14 and a plurality of circumferentially spaced channels 32 which are generally semi-circular in section but emerge from the surface of the deflector to divide its face into symmetrical land portions 34. The channels 32 are ground and polished, it being observed that the depth thereof are greater adjacent the nose portion 30 and shallowest at the outer periphery so as to define tapered restrictions from front-center to rear periphery. A milled and polished radius is formed at the outermost portion of the deflector 18 at the end of each channel 32 to form a flared mouth 36 each of which communicates with the ring-shaped high inventory cavity 38. A polished lip 40 is formed as a cylindrical surface on the deflector concentric with its longitudinal axis, and a chamfered angular surface 42 is diagonally polished with respect to the lips 40 so as to enlarge the cavity 38. Thus, the channels 32 are deep and narrow at the nose 30 where they converge into the passageway 14 but are wide and shallow as they diverge at the periphery of the cone. In this manner, the melt entering the die at the passageway 14 is caused to diverge through the symmetrically disposed channels where it emerges from the lips 40 of the deflector 18 as a continuous sheet entering the high inventory cavity 38. Finally, it is to be noted that the back or valving surface 44 of the deflector 18 is polished smooth and cooperates with the opposing face 46 of second body member 48 to define a flat annular valve zone.

The second body member 48 has an overhanging shoulder 50 which is adapted to slidably lie within an annular circular recess in the first body member 10. The outside surface of the shoulder 50 has a left hand thread 52 formed thereon which is coextensive with a right hand thread 54 formed on the peripheral surface of the first body number 10. An internally threaded nut or ring 56 with spanner holes 58 couples the two externally threaded body members 10 and 48 so that turning the ring 56 in one direction draws the two telescoping body members together. Correspondingly, rotating the ring 56 in the opposite direction draws the first and second body members apart. A plurality of socket head cap screws 60 extend loose through center bored holes 61 in the first body member 10 and threadedly engage corresponding tapped holes 61 in the second body member. The cap screws 60 actually act as a safety in the event of failure of the adjusting ring 56 thereby reinforcing the adjusting ring so as to hold the two body members together. As an alternative a plurality of circumferentially spaced screws 62 in threaded engagement with tapped holes 64 in the first body member 10 are adapted to abut up against the face of the shoulder 50 on the second body member 48. Thus, the disposition of the two body members 10 and 48 with respect to each other may be adjusted by appropriate manipulation of the screws 60 and 62, the former pulling the members together and the latter pushing them apart. Dowels 60 press fit within holes 68 in the first body member slidably engage holes 70 in the second body member 48 to allow the two members to be registered during assembly. A calibrated pin gage 72 is threaded into the shoulder 50 of the second body portion 48 and slidably projects through an aperture in the first member whereby the position of the face of the latter with respect to the calibrations determines the valve spacing between the surfaces 44 and 46.

Projecting rearwardly from the deflector 18 is a tailpiece or mandrel portion 74, the interior peripheral portion of which forms an annular relaxation cavity 75 with the inner diameter of the second body member 48. The flat sheet extruded through the valve space 44–46 empties via the radiused fillet 75A into the larger relaxation zone where the thermoplastic material can recover from the prior shearing action, preparatory to passing through the annular die zone. In the latter regard, the mandrel 76 of the extrusion die proper is threaded upon the complementary threaded distal end of the tailpiece 74. Radially spaced spanner recesses 78 facilitate the assembly and disassembly of the mandrel 76 upon the tailpiece 74. An annular semicircular groove 80 is machined in the rear face of the mandrel 76 to produce a very sharp peripheral lip 82 which maintains the integrity of the inner wall of the tube being extruded through the die proper. That is, the sharp tipped edge 82 prevents wiping of the tube being extruded against the end wall of the die mandrel 76 in the course of normal expansion of the plastic wall through the die. An interior central bore 84 communicates with blind bore 86 in the tailpiece 74 and provides a cavity for insertion of a cartridge heating element (not shown) to raise the temperature of the central portions as desired.

Outer die member 88 is attached to the rear surface of the second body member 48 by means of a clamping ring 90 having circumferentially spaced cap screws 92 therein threaded into corresponding tapped holes in the second body member. The clamping ring 90 bears against flange 94 of the outer die member and urges the flange into abutment with the rear face of the second body member 48. A plurality of circumferentially spaced centering screws 96 are radially threaded through the clamping ring 90 and bear against the outer surface of the flange 94 so that the annular thickness of the extruded cylindrical wall can be made uniform. An electrical heating band 98 can be utilized for elevating the temperature of the outer die 88 and a small pipe tap hole 100 is incorporated in the die 88 to hold a thermocouple for measuring the temperature thereof.

Another thermocouple well 102 extends obliquely from the face of the first body member 10 through one of the lands 34 of the deflector 18 into the mass thereof. A pair of radially spaced openings 104 (only one shown) extend obliquely through the first body member 10 and the deflector 18 into communication with the bore 86. These openings 104 are utilized to carry cartridge heaters for elevating the temperature of the proximal end of the extrusion die. In addition the apertures 104 may be used to force air under pressure through the aligned bores 86 and 84 to blow form the tubular extrusion exiting from the orifice between the mandrel 76 and the die 88.

As is apparent from the foregoing description, the present invention permits in-line extrusion of pipe, tubing, rod, or other shapes without the use of spiders. The flow from the extractor passes into the passageway 14 and then diverges through the channels 32. The flow through the circular channels initiating from a deep narrow section and terminating in shallow wide section allows the thermoplastic material to converge to a substantially flat sheet upon entering the high inventory ring-shaped cavity 38. The converging flow in the high inventory large cross section internal cavity 38 or reservoir. This follows a symmetrical continuous stream before entering the valving area 44–40 and the critical forming section. Any accidental pressure drop is equalized, and the melt enters the valving area with an even front advancing toward the center with the same velocity and internal shear. Adjustment of the valve area spacing 44–46 is accommodated through rotation of the adjustment nut 56 or by way of manipulation of the circumferentially spaced cap screws 60 and 62 with respect to each other. Centrally directed flow deflections in sheet form occur symmetrically as opposed to motion through a round channel wherein the speed in the center is most rapid and slowest at the walls as would be anticipated in a viscous system. Accordingly, increments of the melt in the instant system advance with equal back pressure and velocity without randomly distributed internal stresses as would be the case with the use of a manifold flow. Thus the melt emerging from the forming section is very homogeneous with each increment subjected to the same degree of shear.

Accordingly, a highly uniform heat history is provided within the relaxation zone 75 wherein recovery is made. This arrangement provides a flow geometry of adjustable high shear alternating with relaxation zones, and the pattern allows the melt to be processed and reach the final forming stage under conditions substantially below the critical shear point. By means of the valve 44–46 the back pressure and consequently the mechanical work imparted at the melt can be adjusted at will independently of the relative position of the mandrel and die or the cross section of the extruded melt. Since a well converted melt is delivered, the end products are without surface defects and internal stresses nor are any areas subject to failure because of inherent weak structure.

Although this invention has been described in considerable detail such description is intended as being illustrative other than limiting since the invention may be variously embodied and the scope of the invention may be determined as claimed.

What we claim is:

1. A valving mechanism and die for in-line extrusion of viscous thermoplastic material comprising a body member including an axial passage therein adapted to be coaxially coupled to an extruder, a ring-shaped, high-inventory reservoir co-axially disposed downstream of the axial passage, a plurality of channels radially extending rearwardly and divergently from the axial passage and communicating with said high inventory reservoir, and annular relaxation cavity concentrically disposed centrally with respect to said high inventory reservoir, a disk-shaped valve annulus radially interposed between said high inventory reservoir and said relaxation cavity so as to permit communication therebetween, and a die coupled to the distal end of said body member and having an orifice in registration with said relaxation cavity whereby thermoplastic material will be delivered in a continuous stream to said high inventory reservoir and thence symmetrically and radially inward through said valve annulus into said relaxation cavity to yield well converted melts.

2. The valving mechanism of claim 1 wherein the valving annulus is axially adjustable.

3. The valving mechanism of claim 2 wherein the channels are semi-circular in cross section.

4. The valving mechanism of claim 3 wherein the channels are deeper and narrow adjacent the axial passage and shallower and wider adjacent the high inventory reservoir.

5. The valving mechanism of claim 4 including a thin circular passageway intermediate said channels and said high inventory reservoir to deliver a continuous sheet of material from said channels into said high inventory zone.

6. The valving mechanism of claim 5 including means for heating said die.

7. The valving mechanism of claim 5 including means to introduce gas under pressure through said die whereby tubing extruded therethrough may be blow formed.

8. The valving mechanism of claim 5 including a sharp lip peripherally extending about said die orifice.

References Cited

UNITED STATES PATENTS

| | | | |
|---|---|---|---|
| 2,626,427 | 1/1953 | Brown | 18—14X |
| 3,453,690 | 7/1969 | Mayner | 18—14 |
| 3,471,899 | 10/1969 | Ronden | 18—14 |

J. SPENCER OVERHOLSER, Primary Examiner

L. R. FRYE, Assistant Examiner